(12) United States Patent
Luo

(10) Patent No.: US 12,340,140 B2
(45) Date of Patent: Jun. 24, 2025

(54) SHARING METHOD AND ELECTRONIC DEVICE

(71) Applicant: VIVO MOBILE COMMUNICATION CO., LTD., Dongguan (CN)

(72) Inventor: Zhen Luo, Dongguan (CN)

(73) Assignee: VIVO MOBILE COMMUNICATION CO.,LTD., Guangdong (CN)

( * ) Notice: Subject to any disclaimer, the term of this patent is extended or adjusted under 35 U.S.C. 154(b) by 22 days.

(21) Appl. No.: 18/084,652

(22) Filed: Dec. 20, 2022

(65) Prior Publication Data

US 2023/0120442 A1 Apr. 20, 2023

Related U.S. Application Data

(63) Continuation of application No. PCT/CN2021/100317, filed on Jun. 16, 2021.

(30) Foreign Application Priority Data

Jun. 22, 2020 (CN) .......................... 202010575852.9

(51) Int. Cl.
*G06F 3/0488* (2022.01)
*G06F 3/0482* (2013.01)
(Continued)

(52) U.S. Cl.
CPC .......... *G06F 3/1454* (2013.01); *G06F 3/0484* (2013.01); *G06F 3/04842* (2013.01); *G09G 5/14* (2013.01)

(58) Field of Classification Search
CPC .............. G06F 3/1454; G06F 3/04842; G06F 3/04847; G06F 3/0488; G09G 5/14; G09G 2354/00
See application file for complete search history.

(56) References Cited

U.S. PATENT DOCUMENTS 9,419,923 B2 * 8/2016 Seo .................... H04L 51/04
9,558,281 B2 1/2017 Meckler et al.
(Continued)

FOREIGN PATENT DOCUMENTS

CN 101516018 A 8/2009
CN 103873578 A 6/2014
(Continued)

OTHER PUBLICATIONS

Hiroshi, Kobayashi, "Preparation of a compilation system for a video creator", Video Salons, Kabushiki Kaisha Kabushiki Kaisha, Jan. 1, 2009, pp. 88-91, vol. 57, No. 3.

*Primary Examiner* — Jordany Nunez
(74) *Attorney, Agent, or Firm* — The Webb Law Firm

(57) ABSTRACT

A sharing method includes: receiving screen projection content transmitted by a second electronic device in a case that a first electronic device and the second electronic device are in a screen projection connection and the second electronic device is in a call with a third electronic device; displaying the screen projection content; receiving a first input from a user with regard to a target identifier and a display area of the screen projection content, where the target identifier is used for indicating a target object; and controlling, in response to the first input, the second electronic device to transmit the target object to the third electronic device.

16 Claims, 6 Drawing Sheets

(51) Int. Cl.
*G06F 3/14* (2006.01)
*G06F 3/0484* (2022.01)
*G06F 3/04842* (2022.01)
*G09G 5/14* (2006.01)

(56) References Cited

U.S. PATENT DOCUMENTS

| | | | | |
|---|---|---|---|---|
| 9,591,433 | B2* | 3/2017 | Lee | H04W 88/04 |
| 9,760,331 | B2* | 9/2017 | Lee | G06F 3/04845 |
| 10,185,530 | B2* | 1/2019 | Hwang | G09G 5/003 |
| 10,251,032 | B2* | 4/2019 | Hong | H04W 4/16 |
| 10,503,459 | B2* | 12/2019 | Lim | H04N 21/43637 |
| 10,509,616 | B2* | 12/2019 | Kim | G06F 3/04845 |
| 11,343,304 | B2* | 5/2022 | Korobov | H04L 67/06 |
| 2012/0173622 | A1 | 7/2012 | Toledano et al. | |
| 2014/0240440 | A1* | 8/2014 | Seo | H04L 51/04 715/753 |
| 2015/0382164 | A1* | 12/2015 | Chung | H04W 4/16 455/414.1 |
| 2016/0103650 | A1* | 4/2016 | Lim | G06F 3/147 345/2.2 |
| 2016/0321025 | A1* | 11/2016 | Ikeda | G06F 3/1454 |
| 2016/0378277 | A1* | 12/2016 | Cho | G06F 3/04886 715/814 |
| 2017/0017454 | A1* | 1/2017 | Kim | G06F 3/04845 |
| 2017/0086014 | A1* | 3/2017 | Hwang | H04L 67/55 |
| 2017/0149961 | A1* | 5/2017 | Kim | H04M 1/724 |
| 2017/0264964 | A1* | 9/2017 | Yoon | H04N 21/43615 |
| 2019/0158570 | A1* | 5/2019 | Korobov | H04L 67/06 |
| 2019/0222974 | A1* | 7/2019 | Hong | H04W 4/16 |
| 2019/0272142 | A1 | 9/2019 | Choi et al. | |
| 2020/0012418 | A1* | 1/2020 | Choi | G06V 40/166 |
| 2020/0057596 | A1* | 2/2020 | Kim | G06F 3/147 |
| 2020/0153887 | A1* | 5/2020 | Choi | H04L 67/06 |
| 2021/0042132 | A1 | 2/2021 | Park et al. | |
| 2021/0357862 | A1* | 11/2021 | Lereya | G06Q 10/06313 |
| 2022/0109645 | A1* | 4/2022 | Delp | G06F 3/0482 |
| 2022/0224968 | A1 | 7/2022 | Wang et al. | |
| 2022/0300153 | A1 | 9/2022 | Gu et al. | |

FOREIGN PATENT DOCUMENTS

| | | |
|---|---|---|
| CN | 104750450 A | 7/2015 |
| CN | 108668027 A | 10/2018 |
| CN | 109525710 A | 3/2019 |
| CN | 110109636 A | 8/2019 |
| CN | 110597474 A | 12/2019 |
| CN | 110618970 A | 12/2019 |
| CN | 110673782 A | 1/2020 |
| CN | 111314768 A | 6/2020 |
| CN | 111913628 A | 11/2020 |
| EP | 3118730 A1 | 1/2017 |
| WO | 2019088793 A1 | 5/2019 |

* cited by examiner

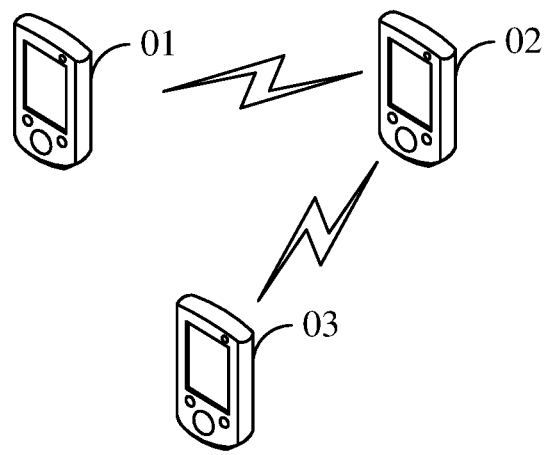

FIG. 1

| A first electronic device receives, in a case that the first electronic device and the second electronic device are in screen projection connection and the second electronic device is in a call with a third electronic device, screen projection content transmitted by a second electronic device | 201 |

| The first electronic device displays the screen projection content | 202 |

| The first electronic device receives a first input from a user with regard to a target identifier and a display area of the screen projection content | 203 |

| The first electronic device controls, in response to the first input, the second electronic device to transmit the target object to the third electronic device | 204 |

FIG. 2

SHARING METHOD AND ELECTRONIC DEVICE

CROSS-REFERENCE TO RELATED APPLICATIONS

This application is a Bypass Continuation Application of PCT/CN2021/100317 filed Jun. 16, 2021, which claims priority to Chinese Patent Application No. 202010575852.9 filed Jun. 22, 2020, the disclosures of which are hereby incorporated by reference in their entirety.

BACKGROUND OF THE INVENTION

Field of the Invention

This application relates to the field of communications technologies, and in particular, to a sharing method and device and an electronic device.

Description of Related Art

Generally, in a scenario of an electronic device 1 in a call with an electronic device 2, if a user of the electronic device 1 (hereinafter referred to as a user 1) wants to share a file (such as an audio or a video) with a user (hereinafter referred to as a user 2) of the electronic device 2, the user 1 may share the audio or video with the user 2 through a file sharing function of a certain application (for example, a third-party application).

Sharing a certain audio is used as an example. The user 1 usually exits a call interface and provides an input with regard to an icon of a third-party application on a desktop of the electronic device 1, so that the electronic device 1 can display the interface of the third-party application. Then the user 1 may provide an input with regard to an identifier of the audio on the interface of the third-party application, so that the electronic device 1 can transmit the audio to the electronic device 2.

However, the entire audio sharing process is too cumbersome and time-consuming, thus resulting in poor convenience for electronic devices to share files.

SUMMARY OF THE INVENTION

In a first aspect, an embodiment of this application provides a sharing method, applied to a first electronic device. The sharing method includes: receiving screen projection content transmitted by a second electronic device in a case that a first electronic device and the second electronic device are in screen projection connection and the second electronic device is in a call with a third electronic device; displaying the screen projection content; receiving a first input from a user with regard to a target identifier and a display area of the screen projection content, where the target identifier is used for indicating a target object; and controlling, in response to the first input, the second electronic device to transmit the target object to the third electronic device.

In a second aspect, an embodiment of this application provides a sharing method, applied to a second electronic device. The sharing method includes: transmitting screen projection content to a first electronic device in a case that a first electronic device and the second electronic device are in screen projection connection and the second electronic device is in a call with a third electronic device; receiving a control instruction transmitted by the first electronic device, where the control instruction is generated by the first electronic device after receiving a first input from a user with regard to a display area of the screen projection content displayed by the first electronic device and a target identifier, and the target identifier is used for indicating a target object; and transmitting the target object to the third electronic device in response to the control instruction.

In a third aspect, an embodiment of this application provides a sharing apparatus. The sharing apparatus is a first sharing apparatus. The first sharing apparatus includes a receiving module, a display module, and a control module. The receiving module is configured to receive screen projection content transmitted by a second sharing apparatus in a case that the first sharing apparatus and the second sharing apparatus are in screen projection connection and the second sharing apparatus is in a call with a third sharing apparatus. The display module is configured to display the screen projection content received by the receiving module. The receiving module is further configured to receive a first input from a user with regard to a target identifier and a display area of the screen projection content displayed by the display module. The target identifier is used for indicating a target object. The control module is configured to control, in response to the first input received by the receiving module, the second sharing apparatus to transmit the target object to the third sharing apparatus.

In a fourth aspect, an embodiment of this application provides a sharing apparatus. The sharing apparatus is a second sharing apparatus. The second sharing apparatus includes a transmission module and a receiving module. The transmission module is configured to transmit screen projection content to a first sharing apparatus in a case that the first sharing apparatus and the second sharing apparatus are in screen projection connection and the second sharing apparatus is in a call with a third sharing apparatus. The receiving module is configured to receive a control instruction transmitted by the first sharing apparatus. The control instruction is generated by the first sharing apparatus after receiving a first input from a user with regard to a display area of the screen projection content displayed by the first sharing apparatus and a target identifier. The target identifier is used for indicating a target object. The transmission module is further configured to transmit the target object to the third sharing apparatus in response to the control instruction received by the receiving module.

In a fifth aspect, an embodiment of this application provides an electronic device, including a processor, a memory, and a program or an instruction stored in the memory and executable on the processor, where when the program or the instruction is executed by the processor, steps of the method according to the first aspect or the second aspect are implemented.

In a sixth aspect, an embodiment of this application provides a non-transitory computer-readable storage medium, storing a program or an instruction, where when the program or the instruction is executed by a processor, the method according to the first aspect or the second aspect is implemented.

In a seventh aspect, an embodiment of this application provides a chip. The chip includes a processor and a communication interface. The communication interface is coupled with the processor, and the processor is configured to execute a program or an instruction to implement the method according to the first aspect or the second aspect.

BRIEF DESCRIPTION OF THE DRAWINGS

FIG. 1 is a schematic structural diagram of a communication system according to an embodiment of this application.

FIG. 2 is a schematic diagram I of a sharing method according to an embodiment of this application.

DESCRIPTION OF THE INVENTION

Figure 3:
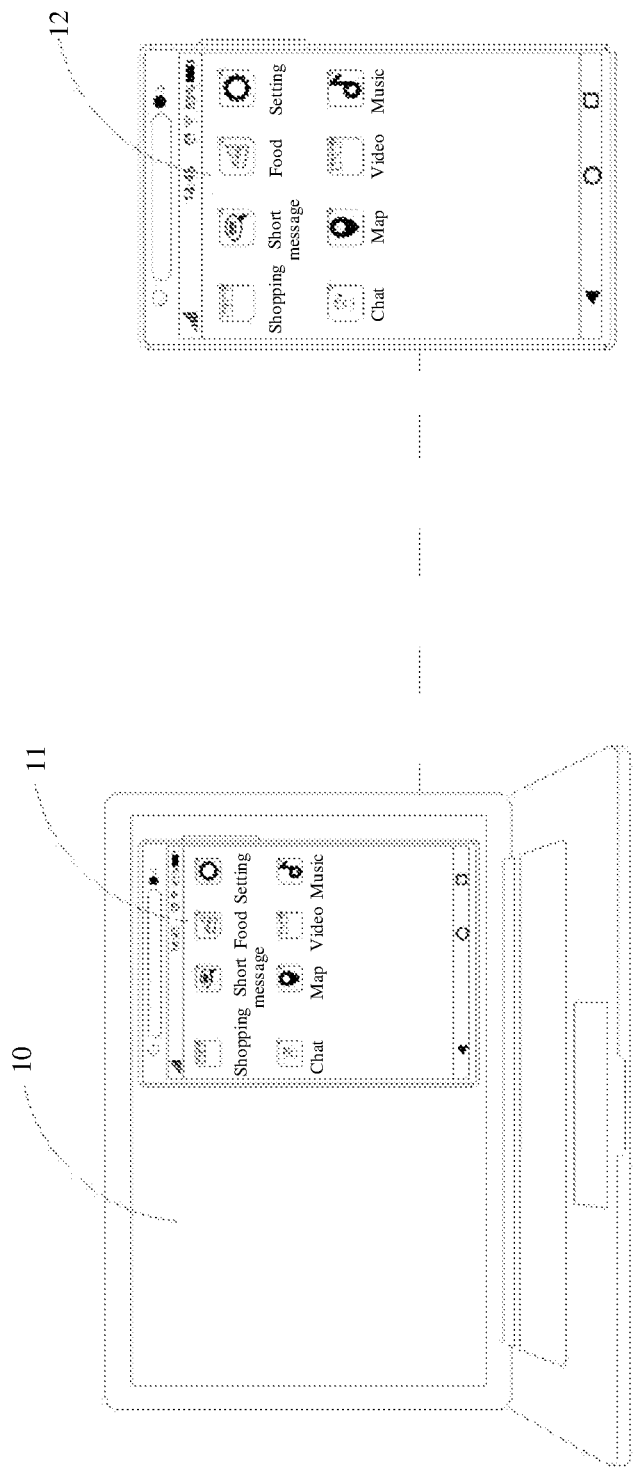
FIG. 3 is a schematic diagram I of an example of a computer interface according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person skilled in the art based on the embodiments of this application shall fall within the protection scope of this application.

The specification and claims of this application, and terms "first" and "second" are used to distinguish similar objects, but are unnecessarily used to describe a specific sequence or order. It should be understood that the data termed in such a way are interchangeable in appropriate circumstances, so that the embodiments of this application can be implemented in orders other than the order illustrated or described herein. In addition, the objects distinguished by "first" and "second" are usually of a same type, without limiting a quantity of objects, for example, there may be one or more first objects. In addition, "and/or" in the description and the claims means at least one of the connected objects, and the character "I" in this specification generally indicates an "or" relationship between the associated objects.

The sharing method provided in the embodiments of this application is described in detail below with reference to the accompanying drawings by using embodiments and application scenarios thereof.

A sharing method provided in the embodiments of this application may be applied to multiplayer audio and video call scenarios.

It is assumed that a user A uses an electronic device A to perform an audio and video call with an electronic device B of a user B. If the user A wants to share a movie (such as a movie A) with the user B, the user A may provide an input to the electronic device A, so that the electronic device A can exit an interface of the audio and video call and display a desktop. In this way, the user A can find an icon of a third-party application (such as an "Album" application) one by one on the desktop, and then the user A may provide an input with regard to the icon of the "Album" application so that the electronic device A can display the interface of the "Album" application. The interface includes a thumbnail of all files (for example, all music files, all movie files, and so on) in the electronic device A. In this way, the user can provide an input with regard to the thumbnail of the movie A into the thumbnail of all of the files, and can provide an input with regard to a "Share" option on the interface, so that the electronic device A can transmit the movie A to the electronic device B. However, the user A needs to provide an input for a plurality of times, so that the electronic device A can transmit the movie A to the electronic device B, which leads to the cumbersome operation of the user during sharing of objects and takes a long time. In this embodiment of this application, when the user A wants to share the movie A with the user B, the user A may trigger screen projection connection between the electronic device A and the electronic device C, so that the electronic device C can display screen projection content of the electronic device A. Then the user A may directly provide an input with regard to an icon of the movie A displayed by the electronic device C and a display area of the screen projection content, so that the electronic device C can control the electronic device A to transmit the movie A to the electronic device B. Therefore, the operation of the user can be simplified and less time-consuming, so as to improve the convenience for the electronic device to share the object.

An embodiment of this application provides a communication system. As shown in FIG. 1, the communication system includes: a first electronic device 01, a second electronic device 02, and a third electronic device 03.

In a case that the first electronic device 01 and the second electronic device 02 are in screen projection connection and the second electronic device 02 is in a call with the third electronic device 03, the second electronic device 02 transmits screen projection content to the first electronic device 01. Then the first electronic device 01 receives and displays the screen projection content transmitted by the second electronic device 02. Then the first electronic device 01 receives a first input from a user with regard to a target identifier and a display area of the screen projection content. The target identifier is used for indicating a target object. The second electronic device 02 is controlled, in response to the first input, to transmit the target object to the third electronic device 03.

In the communication system provided in this embodiment of this application, since when the user needs to share the target object with a user of the third electronic device, the user may trigger the first electronic device to display the screen projection content and may directly provide an input with regard to the target identifier and the display area of the screen projection content, so that the second electronic device can share the target object with the user of the third electronic device, without the need for the user to provide an input to the second electronic device for a plurality of times. Therefore, the operation of the user can be simplified and less time-consuming, so as to improve the convenience for the electronic device to share the object.

Optionally, in this embodiment of this application, the "controlling the second electronic device 02 to transmit the target object to the third electronic device 03" may include: transmitting, by the first electronic device 01, a control instruction to the second electronic device 02, where the control instruction is used for instructing the second electronic device 02 to transmit the target object to the third electronic device 03; receiving, by the second electronic device 02, a control instruction transmitted by the first electronic device 01, where the control instruction is generated by the first electronic device 01 after receiving a first input from a user with regard to a display area of the screen projection content displayed by the first electronic device 01 and a target identifier, and the target identifier is used for indicating a target object; and transmitting the target object to the third electronic device 03 in response to the control instruction.

In this embodiment of this application, since when the user needs to share the target object with the user of the third electronic device, the first electronic device may transmit the control instruction to the second electronic device, so that the second electronic device can transmit the target object to the third electronic device in response to the control instruction. Therefore, the accuracy of transmitting the target object to the third electronic device by the second electronic device can be improved.

Optionally, in this embodiment of this application, the first input includes a drag input performed by a user by dragging the target identifier to the display area of the screen projection content.

In this way, the user may trigger, by providing an input once, the first electronic device to transmit the control instruction to the second electronic device, which can simplify the operation of the user during the sharing and can improve the convenience for the electronic device to share the object.

Optionally, in this embodiment of this application, after "the first electronic device 01 receives the first input from the user with regard to the target identifier and the display area of the screen projection content", in a case that the target object is stored in the first electronic device 01, the first electronic device 01 transmits the target object to the second electronic device 02 in response to the first input. Then the second electronic device 02 receives the target object transmitted by the first electronic device 01.

In this way, rather than only an object stored in the second electronic device, the first electronic device may trigger the second electronic device to share, with the third electronic device, an object not stored in the second electronic device and/or the object stored in the second electronic device. Therefore, the flexibility of the electronic device sharing the object can be improved.

Optionally, in this embodiment of this application, before "the first electronic device 01 receives the screen projection content transmitted by the second electronic device 02", the first electronic device 01 receives a screen projection request transmitted by the second electronic device 02. The screen projection request is used for requesting to project a real-time display interface of the second electronic device 02 onto the first electronic device 01 for display. A screen projection response is transmitted to the second electronic device 02 in response to the screen projection request. The screen projection response is used for indicating that the first electronic device 01 agrees to establish screen projection connection. The screen projection content is used for indicating the real-time display interface of the second electronic device 02.

In this way, since the first electronic device and the second electronic device may be in screen projection connection in a case that the screen projection request transmitted by the second electronic device is received, to display the screen projection content, the user may provide an input with regard to the target identifier and the display area of the screen projection content to quickly trigger the second electronic device to transmit the target object to the third electronic device. Therefore, the operation of the user during the sharing of the object can be simplified, so as to improve the convenience for the electronic device to share the object.

Optionally, in this embodiment of this application, the "displaying of the screen projection content by the first electronic device 01" includes: displaying the screen projection content in a first display area in a display screen of the first electronic device. The "transmitting, by the second electronic device 02, the target object to the third electronic device 03 in response to the control instruction" includes: in a case that the target object includes a video file, in response to the control instruction, displaying, by the second electronic device 02, a first window in the first display area, and playing the video file in the first window; then displaying, by the first electronic device 01, the first window in a suspended manner on a call interface, where the video file is played in the first window; receiving, by the first electronic device 01, a second input from the user with regard to the first window in a case that the target object is not stored in the first electronic device 01; and in response to the second input, displaying, by the first electronic device 01, a second window in a second display area and playing the video file in the second window, where the second display area is a display area in the display screen other than the first display area.

In this way, the first electronic device may play the video file (that is, the target object) on the first electronic device according to the input from the user, so that the user and the user of the third electronic device can watch the video file simultaneously. Therefore, the convenience for the electronic device to share the object can be improved to enhance user experience.

Optionally, in this embodiment of this application, the "transmitting, by the second electronic device 02, the target object to the third electronic device 03 in response to the control instruction" may include: in a case that the target object includes an audio file, in response to the control instruction, synthesizing, by the second electronic device 02, a first audio signal and a second audio signal to obtain a target audio signal and transmitting the target audio signal to the third electronic device 03. The first audio signal is a voice signal corresponding to the call between the second electronic device 02 and the third electronic device 03, and the second audio signal is an audio signal corresponding to the audio file.

In this way, the second electronic device may synthesize the first audio signal and the second audio signal, and transmit the target audio signal obtained through synthesis to the third electronic device, so that the user of the third electronic device can directly listen to the target audio signal without the need to interrupt the call between the second electronic device and the third electronic device. Therefore, the convenience for the electronic device to share the object can be improved.

An embodiment of this application provides a sharing method. The sharing method may be applied to the first electronic device. FIG. 2 is a flowchart of the sharing method according to an embodiment of this application. As shown in FIG. 2, the sharing method provided in this embodiment of this application may include step 201 to step 204 below.

Step 201: A first electronic device receives screen projection content transmitted by a second electronic device in a case that the first electronic device and the second electronic device are in screen projection connection and the second electronic device is in a call with a third electronic device.

Optionally, in this embodiment of this application, in a case that the second electronic device is in a call with the third electronic device, the user may provide an input to the first electronic device to trigger the first electronic device and the second electronic device to be in screen projection connection, so that the first electronic device can receive the screen projection content transmitted by the second electronic device.

Optionally, in this embodiment of this application, the screen projection content includes first display data and first audio data. The first display data is display data corresponding to a real-time display interface of the second electronic device. The first audio data is audio data currently played by the second electronic device.

Optionally, in this embodiment of this application, the call may be any one of an audio call or a video call.

Step 202: The first electronic device displays the screen projection content.

Optionally, in this embodiment of this application, the first electronic device may display the screen projection content with a first display parameter on a display screen of the first electronic device according to the first display data. The first display parameter may be a default display parameter or a display parameter set by the user. The first display parameter may include at least one of a display size, a display position, a display picture hue, or a display brightness value.

It may be understood that the first electronic device may display, in the display screen, interface content on the real-time display interface of the second electronic device.

Optionally, in this embodiment of this application, the first electronic device may display the screen projection content in a suspended manner on a first interface. The first interface may be an interface currently displayed by the first electronic device.

For example, the first electronic device is a computer, the second electronic device is a mobile phone, and the third electronic device is a mobile phone by way of example for description. In a case that the computer and the second electronic device (for example, a mobile phone 1) are in screen projection connection and the mobile phone 1 is in a call with the third electronic device (for example, a mobile phone 2), as shown in FIG. 3, the computer receives screen projection content transmitted by the mobile phone 1, and displays the screen projection content (for example, content 11) on a first interface (for example, an interface 10) of the computer. The screen projection content is used for indicating a real-time display interface (for example, an interface 12) of the mobile phone 1.

Optionally, in this embodiment of this application, after the first electronic device displays the screen projection content, the first electronic device may play the first audio data through a microphone of the first electronic device.

Step 203: The first electronic device receives a first input from a user with regard to a target identifier and a display area of the screen projection content.

In this embodiment of this application, the target identifier is used for indicating a target object.

Optionally, in this embodiment of this application, the target identifier may be any one of an icon of the target object, a name of the target object, or the like.

Optionally, in this embodiment of this application, the target object may include any one of a video file, an audio file, and a document file, an object in the first electronic device, or an object in the second electronic device.

In this embodiment of this application, the first input is used for triggering the first electronic device to control the second electronic device to transmit an object.

Optionally, in this embodiment of this application, the first input may include one or more inputs.

Optionally, in this embodiment of this application, in a case that the target object is the object in the first electronic device, the first interface includes the target identifier. The first input may be a drag input performed by a user for the target identifier and the display area of the screen projection content.

Optionally, in this embodiment of this application, the first input includes a drag input performed by a user by dragging the target identifier to the display area of the screen projection content.

In this embodiment of this application, the user may cause, by providing an input once, the first electronic device to control the second electronic device to transmit the target object to the third electronic device, which can simplify the operation of the user during the sharing of the object and can improve the convenience for the electronic device to share the object.

Figure 4:
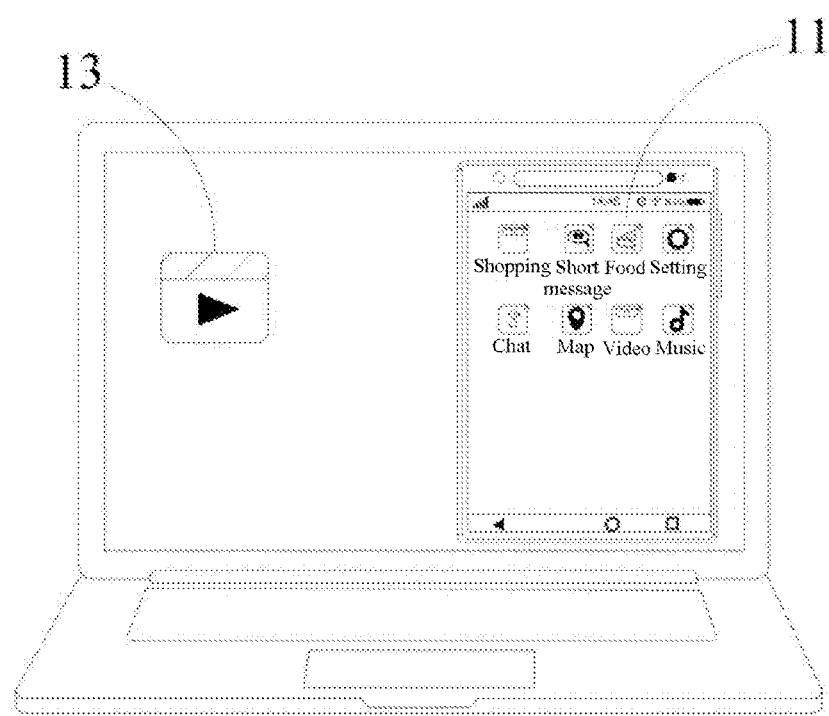
FIG. 4 is a schematic diagram II of an example of a computer interface according to an embodiment of this application.

For example, with reference to FIG. 3, as shown in FIG. 4, the interface 10 displayed by the computer further includes the target identifier (for example, an identifier 13), and the user may provide the first input with regard to the identifier 13 and the content 11 (for example, a drag input), so that the computer can control the mobile phone 1 to transmit the target object to the mobile phone 2.

Optionally, in this embodiment of this application, in a case that the target object is the object in the second electronic device, the first input may include a first sub-input and a second sub-input. The first sub-input is used for triggering the first electronic device to display the target identifier, and the second sub-input is configured to trigger the first electronic device to control the second electronic device to transmit an object.

Optionally, in this embodiment of this application, the user may perform a first sub-input (for example, a click input) on the icon of the first application in the first electronic device, so that the first electronic device can display the interface of the first application and can transmit a first query request to the second electronic device in response to the first sub-input. The first query request is used for requesting to query an object contained in the second electronic device and receive a first query response fed back by the second electronic device in response to the first query request. The first query response includes information of all objects in the second electronic device. Then, the first electronic device may display all identifiers of all of the objects (that is, all objects in the second electronic device) on the interface of the first application according to the information of all of the objects. Therefore, the user may perform a second sub-input with regard to the target identifiers in all of the identifiers and the display area of the screen projection content.

Optionally, in this embodiment of this application, the first application may be a file management application, for example, a "file manager" application.

Step 204: The first electronic device controls, in response to the first input, the second electronic device to transmit the target object to the third electronic device.

Optionally, in this embodiment of this application, step 204 may be implemented by using step 204a below.

Step 204a: The first electronic device transmits a control instruction to the second electronic device in response to the first input.

In this embodiment of this application, the control instruction is used for indicating that the second electronic device transmits the target object to the third electronic device.

In this embodiment of this application, in a case that the second electronic device is in a call with the third electronic device, if the user of the second electronic device (such as the user 1) needs to share the object (for example, a to-be-shared object) with the user of the third electronic device (such as the user 2), the user 1 may trigger screen projection connection between the first electronic device and the second electronic device, so that the first electronic device may receive and display the screen projection content transmitted by the second electronic device. In this way, the user 1 may provide an input with regard to the target identifier displayed by the first electronic device and the display area of the screen projection content, so that the first electronic device can transmit the control instruction to the second electronic device, and the second electronic device can transmit the to-be-shared object to the third electronic device, so as to share the to-be-shared object with the user 2.

In this embodiment of this application, since when the user needs to share the target object with the user of the third electronic device, the first electronic device may transmit the control instruction to the second electronic device, so that the second electronic device can transmit the target object to the third electronic device in response to the control instruction. Therefore, the accuracy of transmitting the target object to the third electronic device by the second electronic device can be improved.

According to the sharing method provided in this embodiment of this application, in a case that the first electronic device and the second electronic device are in screen projection connection and the second electronic device is in a call with the third electronic device, the first electronic device may receive and display the screen projection content transmitted by the second electronic device, and control the second electronic device to transmit the target object to the third electronic device according to the input from the user with regard to the target identifier (that is, an identifier of the target object) and the display area of the screen projection content displayed by the first electronic device. Since when the user needs to share the target object with a user of the third electronic device, the user may trigger the first electronic device to display the screen projection content and may directly provide an input with regard to the target identifier and the display area of the screen projection content so as to share the target object with the user of the third electronic device, without the need for the user to provide an input to the second electronic device for a plurality of times. Therefore, the operation of the user can be simplified and less time-consuming, so as to improve the convenience for the electronic device to share the object.

Figure 5:
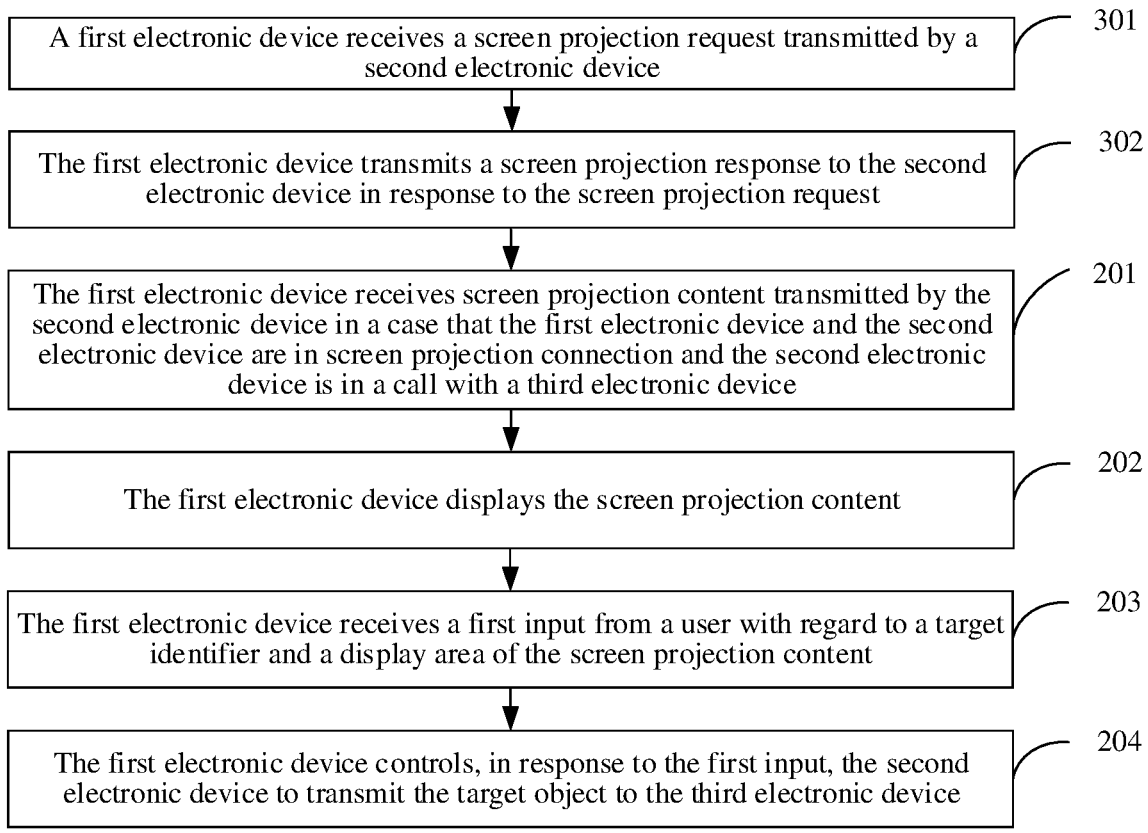
FIG. 5 is a schematic diagram II of a sharing method according to an embodiment of this application.

Optionally, in this embodiment of this application, the screen projection content is used for indicating the real-time display interface of the second electronic device. For example, with reference to FIG. 2, as shown in FIG. 5, before step 201, the sharing method provided in this embodiment of this application may further include step 301 and step 302 below.

Step 301: The first electronic device receives a screen projection request transmitted by a second electronic device.

In this embodiment of this application, the screen projection request is used for requesting to project a real-time display interface of the second electronic device onto the first electronic device for display.

It should be noted that the above "real-time display interface" may be understood as an interface currently displayed by the second electronic device.

Optionally, in this embodiment of this application, the user may provide an input with regard to a "wireless connection" option on the interface of setting an application (that is, setting the application in the first electronic device), so that the first electronic device can enable the wireless connection function and can receive the screen projection request transmitted by the second electronic device.

Optionally, in this embodiment of this application, the first electronic device may establish a wireless connection with the second electronic device (for example, a Bluetooth connection, a wireless fidelity (Wi-Fi) connection, or a wireless local area network (WLAN) connection), so as to receive the screen projection request transmitted by the second electronic device.

Step 302: The first electronic device transmits a screen projection response to the second electronic device in response to the screen projection request.

In this embodiment of this application, the screen projection response is used for indicating that the first electronic device agrees to establish screen projection connection.

Optionally, in this embodiment of this application, the first electronic device may display prompt information on the first interface in response to the screen projection request, to prompt the user whether to agree to establish the screen projection connection, and after the user provides an input with regard to the prompt information (for example, inputs the "Agree" option in the prompt information by clicking), the first electronic device may transmit the screen projection response to the second electronic device.

It may be understood that after the first electronic device transmits the screen projection response to the second electronic device, the second electronic device may transmit the screen projection content to the first electronic device in real time, so that the first electronic device can display the real-time display interface of the second electronic device.

In this embodiment of this application, if the user needs to share the object with the third electronic device, the user may trigger the second electronic device to transmit the screen projection request to the first electronic device, so that the first electronic device can receive the screen projection request and transmit the screen projection response to the second electronic device in response to the screen projection request, to receive and display the screen projection content transmitted by the second electronic device. In this way, the user can provide a first input with regard to the target identifier and the display area of the screen projection content.

In this embodiment of this application, since the first electronic device and the second electronic device may be in screen projection connection in a case that the screen projection request transmitted by the second electronic device is received, to display the screen projection content, the user may provide an input with regard to the target identifier and the display area of the screen projection content to quickly trigger the second electronic device to transmit the target object to the third electronic device. Therefore, the operation of the user during the sharing of the object can be simplified, so as to improve the convenience for the electronic device to share the object.

Optionally, in this embodiment of this application, after step 203, the sharing method provided in this embodiment of this application may further include step 401 below.

Step 401: The first electronic device transmits the target object to the second electronic device in response to the first input in a case that the target object is stored in the first electronic device.

It may be understood that in a case that the target object is an object in the first electronic device (that is, the second electronic device has no target object stored therein), the second electronic device may not transmit the target object to the third electronic device. Therefore, the first electronic device may transmit the target object to the second electronic device, so that the second electronic device can transmit the target object to the third electronic device.

Optionally, in this embodiment of this application, in a case that the first electronic device has no target object stored therein, the user may trigger the first electronic device to run a first application to display the target identifier. Therefore, after step 203, the first electronic device may transmit the target identifier to the second electronic device in response to the first input. In this way, the second electronic device can receive the target identifier and determine the target object according to the target identifier to transmit the target object to the third electronic device.

In this embodiment of this application, rather than only an object stored in the second electronic device, the first electronic device may trigger the second electronic device to share, with the third electronic device, an object not stored in the second electronic device and/or the object stored in the second electronic device. Therefore, the flexibility of the electronic device sharing the object can be improved.

Optionally, in this embodiment of this application, in a case that the target object is a video file, the first electronic device may play the video file after transmitting the control instruction to the second electronic device. For example, step 202 may be implemented by using step 202*a* below, and after step 204, the sharing method provided in this embodiment of this application may further include step 501 to step 503 below.

Step 202*a*: The first electronic device displays the screen projection content in a first display area in a display screen of the first electronic device.

Optionally, in this embodiment of this application, the screen projection content includes interface content on an interface of the call between the second electronic device and the third electronic device.

It may be understood that in a case that the second electronic device is in a call with the third electronic device, the screen projection content is the interface content on the interface of the call between the second electronic device and the third electronic device.

Step 501: The first electronic device displays a first window in a first display area.

In this embodiment of this application, a video file is played in the first window.

It may be understood that the first electronic device may display the first window in a suspended manner on the interface of the call between the second electronic device and the third electronic device.

Optionally, in this embodiment of this application, the first electronic device may open the video file (that is, the target object), and display the first window on the call interface according to a second display parameter to play the video file.

Optionally, in this embodiment of this application, the second display parameter may be a default display parameter or a display parameter set by the user. The second display parameter may include at least one of a display size, a display position, a display picture hue, or a display brightness value.

Step 502: The first electronic device receives a second input from a user with regard to the first window.

In this embodiment of this application, the second input is used for triggering the first electronic device to play the video file.

Optionally, in this embodiment of this application, in a case that the first electronic device has no target object stored therein, the user may provide the second input with regard to the first window.

Optionally, in this embodiment of this application, the second input may be a click input or a drag input from the user with regard to the first window.

Step 503: In response to the second input, the first electronic device displays a second window in a second display area and plays a video file in the second window.

In this embodiment of this application, the second display area is a display area in the display screen other than the first display area.

Optionally, in a possible implementation of this embodiment of this application, the first electronic device may transmit a first instruction to the second electronic device in response to the second input. The first instruction is used for indicating that the second electronic device transmits the video file to the first electronic device, so that the first electronic device can receive a first response fed back by the second electronic device in response to the first instruction. The first response includes the video file. In this way, the first electronic device can display the second window in the second display area according to the video file, and play the video file in the second window.

Optionally, in another possible implementation of this embodiment of this application, in response to the second input, the first electronic device may adjust a display size of the first window to display the second window and play the video file in the second window.

Optionally, in this embodiment of this application, the first electronic device may adjust a first display size of the first window to a second display size, so as to display the second window in the second display area and play the video file in the second window. The first display size is less than the second display size.

In this embodiment of this application, in a case that the first electronic device has no target object stored therein, if the user needs to play the video file (that is, the target object) in the first electronic device, the user may provide an input with regard to the first window, so that the first electronic device can display the second window and play the video file in the second window.

In this embodiment of this application, in a case that the first electronic device has the target object stored therein, if the user needs to play the video file (that is, the target object) in the first electronic device, the user may directly provide an input with regard to the target identifier in the first electronic device, so that the first electronic device can directly play the video file.

In this embodiment of this application, the first electronic device may play the video file (that is, the target object) on the first electronic device according to the input from the user, so that the user and the user of the third electronic device can watch the video file simultaneously. Therefore, the convenience for the electronic device to share the object can be improved to enhance user experience.

Figure 6:
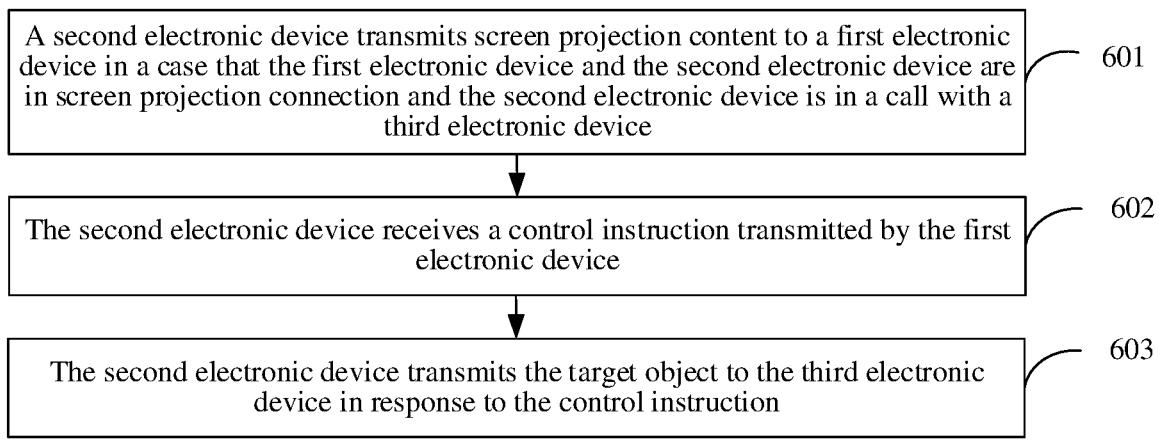
FIG. 6 is a schematic diagram III of a sharing method according to an embodiment of this application.

An embodiment of this application provides a sharing method. The sharing method may be applied to a second electronic device. FIG. 6 is a flowchart of the sharing method according to an embodiment of this application. As shown in FIG. 6, the sharing method provided in this embodiment of this application may include step 601 to step 603 below.

Step 601: A second electronic device transmits screen projection content to a first electronic device in a case that the first electronic device and the second electronic device are in screen projection connection and the second electronic device is in a call with a third electronic device.

Optionally, in this embodiment of this application, during use of the second electronic device by the user, the user may trigger the foreground of the second electronic device to run a second application, and may provide an input with regard to a user identifier in the interface of the second application, so that the second electronic device can be in a call with the third electronic device. The user identifier is used for indicating a user of the third electronic device. When the user needs to share an object with the user of the third electronic device, the user may provide an input with regard to a "wireless connection" option in the interface of setting an application (that is, setting the application in the second electronic device), so that the second electronic device can enable the wireless connection function and display at least one device identifier. In this way, the user can provide an input with regard to the device identifier of the first electronic device in the at least one device identifier, so that the first electronic device can transmit a screen projection request to the second electronic device, and the first electronic device and the second electronic device are in screen projection connection in a case that the screen projection response fed back by the second electronic device in response to the screen projection request is received.

Optionally, in this embodiment of this application, the second application may be an application having a call function, for example, a chat application.

It should be noted that for the description of the screen projection content, reference may be made to the detailed description in the above embodiments, and the details are not described herein again in this embodiment of this application.

Step 602: The second electronic device receives a control instruction transmitted by the first electronic device.

In this embodiment of this application, the control instruction is generated by the first electronic device after receiving a first input from a user with regard to a display area of the screen projection content displayed by the first electronic device and a target identifier. The target identifier is used for indicating a target object.

Step 603: The second electronic device transmits the target object to the third electronic device in response to the control instruction.

Optionally, in this embodiment of this application, the second electronic device may transmit the target object to the third electronic device through a voice channel in which the second electronic device is in a call with the third electronic device.

In this embodiment of this application, in a case that the second electronic device is in a call with the third electronic device, if the user of the second electronic device (such as the user 1) needs to share the object (for example, a to-be-shared object) with the user of the third electronic device (such as the user 2), the user 1 may trigger screen projection connection between the first electronic device and the second electronic device, so that the second electronic device can transmit the screen projection content to the first electronic device. In this way, the user 1 can trigger the first electronic device to transmit the control instruction to the second electronic device, and the second electronic device can transmit the to-be-shared object to the third electronic device, so as to share the to-be-shared object with the user 2.

According to the sharing method provided in this embodiment of this application, in a case that the first electronic device and the second electronic device are in screen projection connection and the second electronic device is in a call with the third electronic device, the second electronic device may transmit the screen projection content to the first electronic device, and may receive a control instruction generated after a first input from a user with regard to a display area of the screen projection content displayed by the first electronic device and a target identifier is received, so as to transmit the target object to the third electronic device according to the control instruction. Since the user may trigger the second electronic device to transmit the screen projection content to the first electronic device when the user needs to share the target object with a user of the third electronic device, the second electronic device may receive the control instruction transmitted by the first electronic device and may directly share the target object with the user of the third electronic device according to the control instruction, without the need for the user to provide an input to the second electronic device for a plurality of times. Therefore, the operation of the user can be simplified and less time-consuming, so as to improve the convenience for the electronic device to share the object.

Optionally, in this embodiment of this application, step 603 may be implemented by using step 603a below.

Step 603a: In a case that the target object includes an audio file, in response to the control instruction, the second electronic device synthesizes a first audio signal and a second audio signal to obtain a target audio signal and transmits the target audio signal to the third electronic device.

In this embodiment of this application, the first audio signal is a voice signal corresponding to the call between the second electronic device and the third electronic device. The second audio signal is an audio signal corresponding to the audio file.

It should be noted that the "voice signal corresponding to the call between the second electronic device and the third electronic device" may be understood as a voice signal collected by a microphone of the second electronic device in a case that the second electronic device is in a call with the third electronic device.

Optionally, in this embodiment of this application, the second electronic device may mix and synthesize the first audio signal with the second audio signal to obtain the target audio signal.

In this embodiment of this application, in a case that the second electronic device is in a call with the third electronic device, since the third electronic device cannot directly play the audio file, the second electronic device may synthesize the audio signal corresponding to the audio file and the voice signal collected by the microphone of the second electronic device, so that the user of the third electronic device can listen to the audio file shared by the user of the first electronic device during a call.

In this embodiment of this application, the second electronic device may synthesize the first audio signal and the second audio signal, and transmit the target audio signal obtained through synthesis to the third electronic device, so that the user of the third electronic device may directly listen to the target audio signal without the need to interrupt the call between the second electronic device and the third electronic device. Therefore, the convenience for the electronic device to share the object can be improved.

Optionally, in this embodiment of this application, in a case that the target object includes a video file, the video file may include second display data and a third audio signal. The second display data is display data corresponding to video frames of the video file. The third audio signal is an audio signal corresponding to the video file. The second electronic device may transmit the second display data to the third electronic device, synthesize the first audio signal and the third audio signal to obtain a first target audio signal and transmit the first target audio signal to the third electronic device in response to the control instruction.

In this embodiment of this application, in a case that the second electronic device is in a call with the third electronic device, since the third electronic device cannot directly play the video file, the second electronic device may transmit display data corresponding to the video file to the third electronic device, and synthesize the audio signal corresponding to the video file and the voice signal collected by the microphone of the second electronic device, so that the user of the third electronic device can watch the video file shared by the user of the first electronic device during a call.

Figure 7:
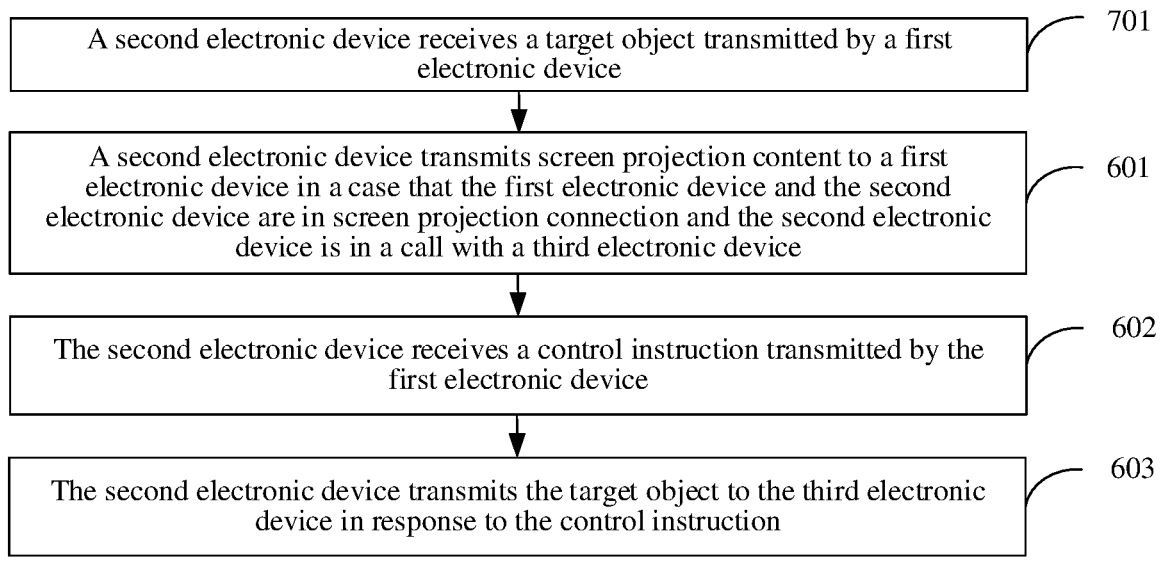
FIG. 7 is a schematic diagram IV of a sharing method according to an embodiment of this application.

Optionally, in this embodiment of this application, with reference to FIG. 6, as shown in FIG. 7, before step 602, the sharing method provided in this embodiment of this application may further include step 701 below.

Step 701: A second electronic device receives a target object transmitted by a first electronic device.

Optionally, in this embodiment of this application, in a case that the second electronic device has no target object stored therein, the second electronic device may receive the target object from the first electronic device.

It may be understood that in a case that the target object is an object in the first electronic device (that is, the second electronic device has no target object stored therein), the second electronic device may not transmit the target object to the third electronic device. Therefore, the second electronic device may receive the target object and transmit the target object to the third electronic device.

In this embodiment of this application, rather than only an object stored in the second electronic device, the second electronic device may share, with the third electronic device, an object not stored in the second electronic device and/or the object stored in the second electronic device. Therefore, the flexibility of the electronic device sharing the object can be improved.

Optionally, in this embodiment of this application, after step 602, the sharing method provided in this embodiment of this application may further include step 801 below.

Step 801: In a case that the target object includes a video file, in response to the control instruction, the second electronic device displays a first window on an interface of the call between the second electronic device and the third electronic device and plays the video file in the first window.

Optionally, in this embodiment of this application, in response to the control instruction, the second electronic device may display the first window in a suspended manner on the interface of the call between the second electronic device and the third electronic device according to a third display parameter and play the video file in the first window.

In this embodiment of this application, the second electronic device may play the video file (that is, the target object) on the interface of the call between the second electronic device and the third electronic device (that is, a call interface displayed by the second electronic device) according to the control instruction, so that the user and the user of the third electronic device can watch the video file simultaneously. Therefore, the convenience for the electronic device to share the object can be improved to enhance user experience.

It should be noted that the sharing method provided in this embodiment of this application may be performed by a sharing apparatus or a control module in the sharing apparatus configured to perform the sharing method. In this embodiment of this application, the sharing apparatus performs the sharing method by way of example to describe the sharing method provided in this embodiment of this application.

Figure 8:
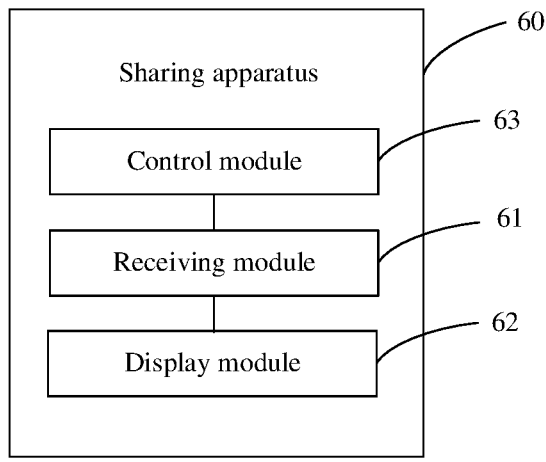
FIG. 8 is a schematic structural diagram I of a sharing apparatus according to an embodiment of this application.

FIG. 8 is a schematic structural diagram of a sharing apparatus according to an embodiment of this application. As shown in FIG. 8, the sharing apparatus 60 may include a receiving module 61, a display module 62, and a control module 63.

The receiving module 61 is configured to receive screen projection content transmitted by a second sharing apparatus in a case that the first sharing apparatus and the second sharing apparatus are in screen projection connection and the second sharing apparatus is in a call with a third sharing apparatus. The display module 62 is configured to display the screen projection content received by the receiving module 61. The receiving module 61 is further configured to receive a first input from a user with regard to a target identifier and a display area of the screen projection content displayed by the display module. The target identifier is used for indicating a target object. The control module 63 is configured to control, in response to the first input received by the receiving module 61, the second sharing apparatus to transmit the target object to the third sharing apparatus.

In a possible implementation, the sharing apparatus 60 provided in this embodiment of this application may further include a transmission module. The transmission module is configured to transmit a control instruction to the second sharing apparatus. The control instruction is used for controlling the second sharing apparatus to transmit the target object to the third sharing apparatus.

In a possible implementation, the first input includes a drag input performed by a user by dragging the target identifier to the display area of the screen projection content.

In a possible implementation, the sharing apparatus 60 provided in this embodiment of this application may further include a transmission module. The transmission module is further configured to transmit the target object to the second sharing apparatus in response to the first input in a case that the target object is stored in the first sharing apparatus.

In a possible implementation, the receiving module 61 is further configured to receive a screen projection request transmitted by the second sharing apparatus. The screen projection request is used for requesting to project a real-time display interface of the second sharing apparatus onto the first sharing apparatus for display. The sharing apparatus 60 provided in this embodiment of this application may further include a transmission module. The transmission module is further configured to transmit a screen projection response to the second sharing apparatus in response to the screen projection request received by the receiving module 61. The screen projection response is used for indicating that the first sharing apparatus agrees to establish screen projection connection. The screen projection content is used for indicating the real-time display interface of the second sharing apparatus.

In a possible implementation, the target object includes a video file. The display module 62 is further configured to display the screen projection content in a first display area in a display screen of the first sharing apparatus. The display module 62 is further configured to display a first window in the first display area. The video file is played in the first window. The receiving module 61 is further configured to receive a second input from the user with regard to the first window displayed by the display module in a case that the first sharing apparatus has no target object stored therein.

The display module 62 is further configured to: in response to the second input received by the receiving module 61, display a second window in a second display area and play the video file in the second window. The second display area is a display area in the display screen other than the first display area.

In the sharing apparatus provided in this embodiment of this application, since when the user needs to share the target object with a user of the third sharing apparatus, the user may trigger the first sharing apparatus to display the screen projection content and may directly provide an input with regard to the target identifier and the display area of the screen projection content, so as to share the target object with the user of the third sharing apparatus, without the need for the user to provide an input to the second sharing apparatus for a plurality of times. Therefore, the operation of the user can be simplified and less time-consuming, so as to improve the convenience for the sharing apparatus to share the object.

It should be noted that the sharing apparatus provided in this embodiment of this application may be configured to perform the sharing method performed by the first sharing apparatus of the above embodiment.

The sharing apparatus in this embodiment of this application may be a device, or may be a component, an integrated circuit, or a chip in a terminal. The device may be a mobile electronic device or a non-mobile electronic device. For example, the mobile electronic device may be a mobile phone, a tablet computer, a notebook computer, a palm computer, an on-board electronic device, a wearable device, an ultra-mobile personal computer (UMPC), a netbook, or a personal digital assistant (PDA). The non-mobile electronic device may be a server, a network attached storage (NAS), a personal computer (PC), a television (TV), a teller machine, or a self-service machine, which is not limited in this embodiment of this application.

The sharing apparatus in this embodiment of this application may be a device with an operating system. The operating system may be an Android operating system, may be an iOS operating system, and may further be other possible operating systems, which is not limited in this embodiment of this application.

The sharing apparatus provided in this embodiment of this application can implement each process implemented by the embodiments of the sharing method in FIG. 1 to FIG. 8. In order to avoid repetition, details are not described herein again.

Figure 9:
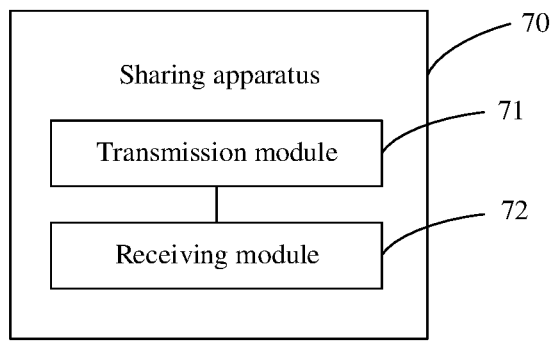
FIG. 9 is a schematic structural diagram II of a sharing apparatus according to an embodiment of this application.

FIG. 9 is a schematic structural diagram of a sharing apparatus according to an embodiment of this application. As shown in FIG. 9, the sharing apparatus 70 may include a transmission module 71 and a receiving module 72.

The transmission module 71 is configured to transmit screen projection content to a first sharing apparatus in a case that the first sharing apparatus and the second sharing apparatus are in screen projection connection and the second sharing apparatus is in a call with a third sharing apparatus. The receiving module 72 is configured to receive a control instruction transmitted by the first sharing apparatus. The control instruction is generated by the first sharing apparatus after receiving a first input from a user with regard to a display area of the screen projection content displayed by the first sharing apparatus and a target identifier. The target identifier is used for indicating a target object. The transmission module 71 is further configured to transmit the target object to the third sharing apparatus in response to the control instruction received by the receiving module 72.

In a possible implementation, the receiving module 72 is further configured to receive the target object transmitted by the first sharing apparatus.

In a possible implementation, the sharing apparatus 70 provided in this embodiment of this application may further include a display module. The display module is configured to: in a case that the target object includes a video file, in response to the control instruction, display a first window on an interface of the call between the second sharing apparatus and the third sharing apparatus and play the video file in the first window.

In a possible implementation, the transmission module 71 is further configured to: in a case that the target object includes an audio file, in response to the control instruction, synthesize a first audio signal and a second audio signal to obtain a target audio signal and transmit the target audio signal to the third sharing apparatus. The first audio signal is a voice signal corresponding to the call between the second sharing apparatus and the third sharing apparatus, and the second audio signal is an audio signal corresponding to the audio file.

In the sharing apparatus provided in this embodiment of this application, since when the user needs to share the target object with a user of the third sharing apparatus, the user may trigger the second sharing apparatus to transmit the screen projection content to the first sharing apparatus, so that the second sharing apparatus can receive the control instruction transmitted by the first sharing apparatus and can directly share the target object with the user of the third sharing apparatus according to the control instruction, without the need for the user to provide an input to the second sharing apparatus for a plurality of times. Therefore, the operation of the user can be simplified and less time-consuming, so as to improve the convenience for the sharing apparatus to share the object.

It should be noted that the sharing apparatus provided in this embodiment of this application may be configured to perform the sharing method performed by the second sharing apparatus of the above embodiment.

The sharing apparatus in this embodiment of this application may be a device, or may be a component, an integrated circuit, or a chip in a terminal. The device may be a mobile electronic device or a non-mobile electronic device. For example, the mobile electronic device may be a mobile phone, a tablet computer, a notebook computer, a palm computer, an on-board electronic device, a wearable device, an ultra-mobile personal computer (UMPC), a netbook, or a personal digital assistant (PDA). The non-mobile electronic device may be a server, a network attached storage (NAS), a personal computer (PC), a television (TV), a teller machine, or a self-service machine, which is not limited in this embodiment of this application.

The sharing apparatus in this embodiment of this application may be a device with an operating system. The operating system may be an Android operating system, may be an iOS operating system, and may further be other possible operating systems, which is not limited in this embodiment of this application.

The sharing apparatus provided in this embodiment of this application can implement each process implemented by the embodiments of the sharing method in FIG. 1 to FIG. 8. In order to avoid repetition, details are not described herein again.

Figure 10:
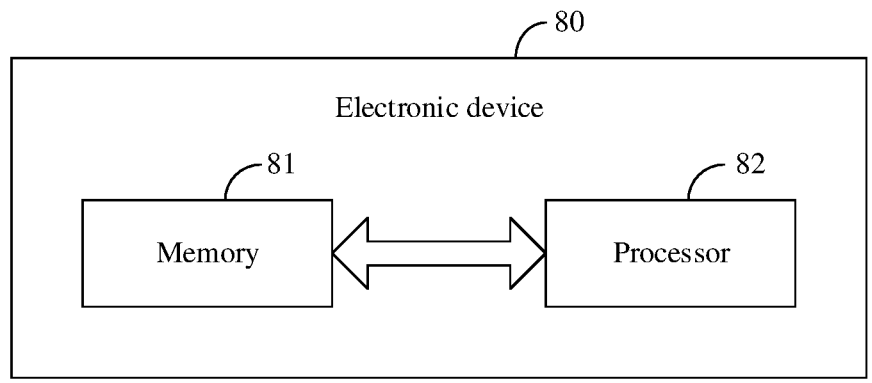
FIG. 10 is a schematic structural diagram of an electronic device according to an embodiment of this application.

Optionally, as shown in FIG. 10, an embodiment of this application further provides an electronic device 80. The electronic device includes a processor 82, a memory 81, a program or an instruction stored in the memory 81 and executable on the processor 82. When the program or the instruction is executed by the processor 82, the processes of the embodiments of the sharing method are implemented, and the same technical effect can be achieved. In order to avoid repetition, details are not described herein again.

It should be noted that the electronic device in this embodiment of this application includes the mobile electronic device and the non-mobile electronic device.

Figure 11:
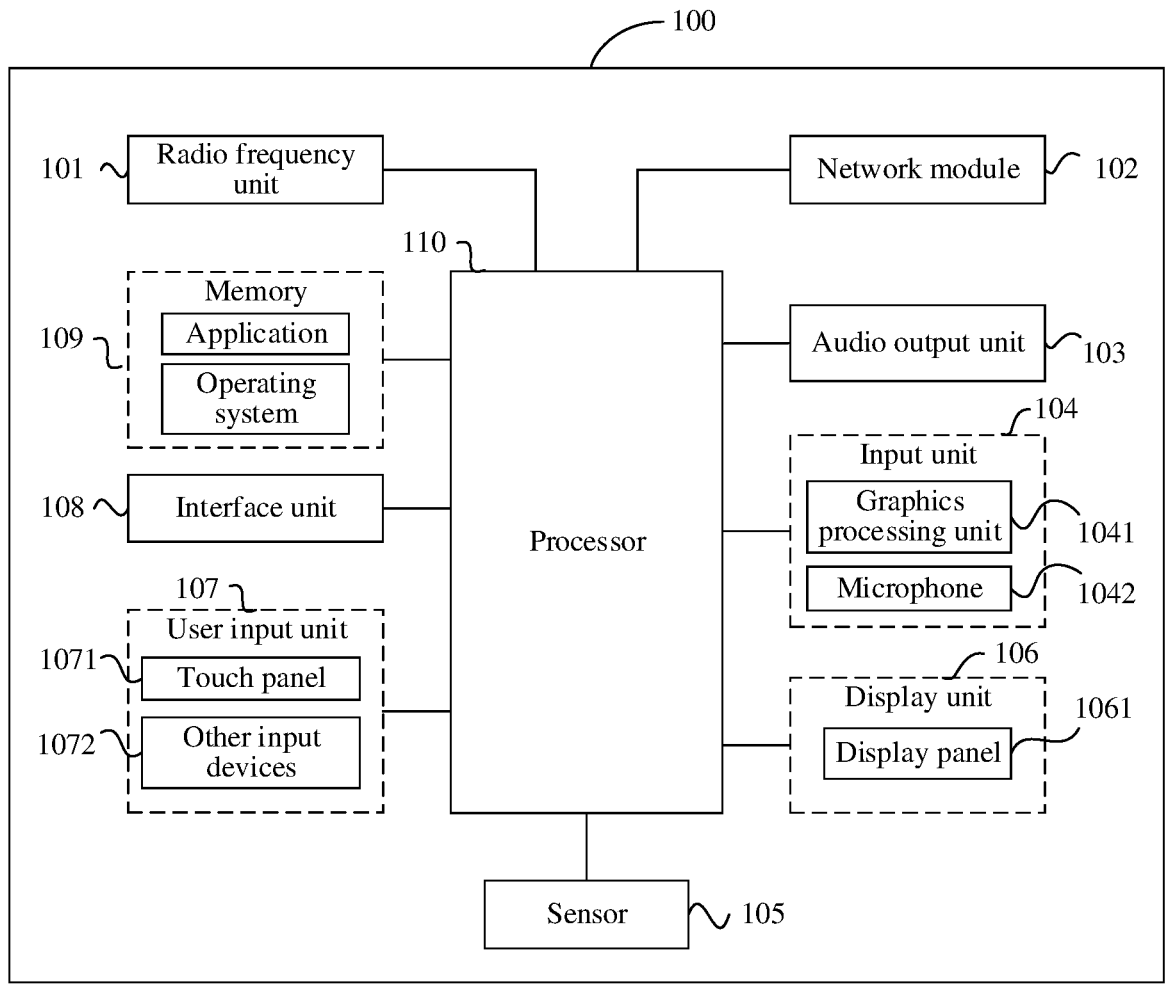
FIG. 11 is a schematic diagram of hardware of an electronic device according to an embodiment of this application.

FIG. 11 is a schematic structural diagram of hardware of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and the like.

A person skilled in the art may understand that the electronic device 100 may further include the power supply (such as a battery) for supplying power to the components. The power supply may logically connect to the processor 110 by using a power supply management system, thereby implementing functions, such as charging, discharging, and power consumption management, by using the power supply management system. The electronic device structure shown in FIG. 11 does not constitute a limitation to the electronic device. The electronic device may include more or fewer components than those shown in the figure, or some components may be combined, or a different component deployment may be used. Details are not described herein again.

The radio frequency unit 101 is configured to receive screen projection content transmitted by a second electronic device in a case that a first electronic device and the second electronic device are in screen projection connection and the second electronic device is in a call with a third electronic device.

The display unit 106 is configured to display the screen projection content.

The user input unit 107 is further configured to receive a first input from a user with regard to a target identifier and a display area of the screen projection content. The target identifier is used for indicating a target object.

The processor 110 is further configured to control, in response to the first input, the second electronic device to transmit the target object to the third electronic device.

According to the electronic device provided in this embodiment of this application, since when the user needs to share the target object with a user of the third electronic device, the user may trigger the first electronic device to display the screen projection content and may directly provide an input with regard to the target identifier and the display area of the screen projection content so as to share the target object with the user of the third electronic device, without the need for the user to provide an input to the second electronic device for a plurality of times. Therefore, the operation of the user can be simplified and less time-consuming, so as to improve the convenience for the electronic device to share the object.

Optionally, in this embodiment of this application, the radio frequency unit 101 is configured to transmit a control instruction to the second electronic device. The control instruction is used for controlling the second electronic device to transmit the target object to the third electronic device.

In this embodiment of this application, since when the user needs to share the target object with the user of the third electronic device, the first electronic device may transmit the control instruction to the second electronic device, so that the second electronic device can transmit the target object to the third electronic device in response to the control instruction. Therefore, the accuracy of transmitting the target object to the third electronic device by the second electronic device can be improved.

Optionally, in this embodiment of this application, the radio frequency unit 101 is further configured to transmit the target object to the second electronic device in response to the first input in a case that the target object is stored in the first electronic device.

In this way, rather than only an object stored in the second electronic device, the first electronic device may trigger the second electronic device to share, with the third electronic device, an object not stored in the second electronic device and/or the object stored in the second electronic device. Therefore, the flexibility of the electronic device sharing the object can be improved.

Optionally, in this embodiment of this application, the radio frequency unit 101 is further configured to receive a screen projection request transmitted by the second electronic device. The screen projection request is used for requesting to project a real-time display interface of the second electronic device onto the first electronic device for display. A screen projection response is transmitted to the second electronic device in response to the screen projection request. The screen projection response is used for indicating that the first electronic device agrees to establish screen projection connection. The screen projection content is used for indicating the real-time display interface of the second electronic device.

In this way, since the first electronic device and the second electronic device may be in screen projection connection in a case that the screen projection request transmitted by the second electronic device is received, to display the screen projection content, the user may provide an input with regard to the target identifier and the display area of the screen projection content to quickly trigger the second electronic device to transmit the target object to the third electronic device. Therefore, the operation of the user during the sharing of the object can be simplified, so as to improve the convenience for the electronic device to share the object.

Optionally, in this embodiment of this application, the target object includes a video file. The display unit 106 is further configured to display the screen projection content in a first display area in a display screen of the first electronic device, and display a first window in the first display area. The video file is played in the first window.

The user input unit 107 is further configured to receive a second input from a user with regard to the first window.

The display unit 106 is further configured to: in response to the second input, display a second window in a second display area and play the video file in the second window. The second display area is a display area in the display screen other than the first display area.

In this way, the first electronic device may play the video file (that is, the target object) on the first electronic device according to the input from the user, so that the user and the user of the third electronic device can watch the video file simultaneously. Therefore, the convenience for the electronic device to share the object can be improved to enhance user experience.

It may be understood that in this embodiment of this application, the input unit 104 may include a graphics processors unit (GPU) 1041 and a microphone 1042. The graphic processing unit 1041 is configured to process image data of a static picture or video obtained by an image capture device (such as a camera) in a video capture mode or an image capture mode. The display unit 106 may include a display panel 1061, and the display panel 1061 may be configured in the form of a liquid crystal display, an organic light-emitting diode, and so on. The user input unit 107 includes a touch panel 1071 and other input devices 1072. The touch panel 1071 is also referred to as a touch screen. The touch panel 1071 may include a touch detection device and a touch controller. Other input devices 1072 may include but are not limited to one or more of a physical keyboard, a function button (such as a volume control button, a switch button, and the like), a trackball, a mouse, a joystick, and the details are not described herein again. The memory 109 may be configured to store software programs and various data, including but not limited to an application and an operating system. The processor 110 may integrate an application processor and a modem processor. The application processor mainly processes an operating system, a user interface, an application program, and the like, and the modem processor mainly processes wireless communication. It may be understood that the foregoing modem processor may not be integrated into the processor 110.

It should be noted that the electronic device provided in this embodiment of this application may be configured to perform the sharing method performed by the first sharing apparatus of the above embodiment.

FIG. 11 is a schematic structural diagram of hardware of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and the like.

A person skilled in the art may understand that the electronic device 100 may further include the power supply (such as a battery) for supplying power to the components. The power supply may logically connect to the processor 110 by using a power supply management system, thereby implementing functions, such as charging, discharging, and power consumption management, by using the power supply management system. The electronic device structure shown in FIG. 11 does not constitute a limitation to the electronic device. The electronic device may include more or fewer components than those shown in the figure, or some components may be combined, or a different component deployment may be used. Details are not described herein again.

The radio frequency unit 101 is configured to: transmit screen projection content to a first electronic device in a case that a first electronic device and the second electronic device are in screen projection connection and the second electronic device is in a call with a third electronic device; receive a control instruction transmitted by the first electronic device, where the control instruction is generated by the first electronic device after receiving a first input from a user with regard to a display area of the screen projection content displayed by the first electronic device and a target identifier, and the target identifier is used for indicating a target object; and transmit the target object to the third electronic device in response to the control instruction.

In this way, since the user may trigger the second electronic device to transmit the screen projection content to the first electronic device when the user needs to share the target object with a user of the third electronic device, the second electronic device may receive the control instruction transmitted by the first electronic device and may directly share the target object with the user of the third electronic device according to the control instruction, without the need for the user to provide an input to the second electronic device for a plurality of times. Therefore, the operation of the user can be simplified and less time-consuming, so as to improve the convenience for the electronic device to share the object.

Optionally, in this embodiment of this application, the radio frequency unit 101 is further configured to receive the target object transmitted by the first electronic device.

In this way, rather than only an object stored in the second electronic device, the second electronic device may share, with the third electronic device, an object not stored in the second electronic device and/or the object stored in the second electronic device. Therefore, the flexibility of the electronic device sharing the object can be improved.

Optionally, in this embodiment of this application, the display unit 106 is configured to: in a case that the target object includes a video file, in response to the control instruction, display a first window on an interface of the call between the second electronic device and the third electronic device and play the video file in the first window.

In this way, the second electronic device may play the video file (that is, the target object) on the interface of the call between the second electronic device and the third electronic device (that is, a call interface displayed by the second electronic device) according to the control instruction, so that the user and the user of the third electronic device can watch the video file simultaneously. Therefore, the convenience for the electronic device to share the object can be improved to enhance user experience.

Optionally, in this embodiment of this application, the processor 110 is configured to: in a case that the target object includes an audio file, in response to the control instruction, synthesize a first audio signal and a second audio signal to obtain a target audio signal.

The radio frequency unit 101 is further configured to transmit the target audio signal to the third electronic device.

The first audio signal is a voice signal corresponding to the call between the second electronic device and the third electronic device, and the second audio signal is an audio signal corresponding to the audio file.

In this way, the second electronic device may synthesize the first audio signal and the second audio signal, and transmit the target audio signal obtained through synthesis to the third electronic device, so that the user of the third electronic device can directly listen to the target audio signal without the need to interrupt the call between the second electronic device and the third electronic device. Therefore, the convenience for the electronic device to share the object can be improved.

It may be understood that in this embodiment of this application, the input unit 104 may include a graphics processors unit (GPU) 1041 and a microphone 1042. The graphic processing unit 1041 is configured to process image data of a static picture or video obtained by an image capture device (such as a camera) in a video capture mode or an image capture mode. The display unit 106 may include a display panel 1061, and the display panel 1061 may be configured in the form of a liquid crystal display, an organic light-emitting diode, and so on. The user input unit 107 includes a touch panel 1071 and other input devices 1072. The touch panel 1071 is also referred to as a touch screen. The touch panel 1071 may include a touch detection device and a touch controller. Other input devices 1072 may include but are not limited to one or more of a physical keyboard, a function button (such as a volume control button, a switch button, and the like), a trackball, a mouse, a joystick, and the details are not described herein again. The memory 109 may be configured to store software programs and various data, including but not limited to an application and an operating system. The processor 110 may integrate an application processor and a modem processor. The application processor mainly processes an operating system, a user interface, an application program, and the like, and the modem processor mainly processes wireless communication. It may be understood that the foregoing modem processor may not be integrated into the processor 110.

It should be noted that the electronic device provided in this embodiment of this application may be configured to perform the sharing method performed by the second sharing apparatus of the above embodiment.

An embodiment of this application further provides a non-transitory computer-readable storage medium. The non-transitory computer-readable storage medium stores a program or an instruction. When the program or the instruction is executed by a processor, the processes of the embodiments of the sharing method are implemented, and the same technical effect can be achieved. In order to avoid repetition, details are not described herein again.

The processor is the processor in the electronic device in the above embodiment. The non-transitory computer-readable storage medium includes a computer read-only memory (ROM), a random access memory (RAM), a magnetic disk, or an optical disk.

An embodiment of this application further provides a chip. The chip includes a processor and a communication interface. The communication interface is coupled with the processor, and the processor is configured to execute a program or an instruction to implement the processes of the embodiments of the sharing method and can achieve the same technical effect. In order to avoid repetition, details are not described herein again.

It should be understood that the chip mentioned in this embodiment of this application may also be referred to as a system on chip, a system chip, a chip system, or a system on a chip.

It should be noted that the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions in the foregoing implementations, a person skilled in the art may clearly learn that the method according to the foregoing embodiment may be implemented by software plus a necessary universal hardware platform, or by using hardware, but in many cases, the former is a preferred implementation. Based on such an understanding, the technical solutions of this application essentially or the part contributing to the prior art may be implemented in the form of a software product. The computer software product is stored in a storage medium (such as a ROM/a RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing implementations. The foregoing implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A sharing method, applied to a first electronic device, the method comprising:

receiving screen projection content transmitted by a second electronic device in a case that the first electronic device and the second electronic device are in a screen projection connection and the second electronic device is in a call with a third electronic device;

displaying the screen projection content;

receiving a first input from a user with regard to a target identifier and a display area of the screen projection content, wherein the target identifier is used for indicating a target object, and the target object is an object in the second electronic device; and transmitting a control instruction to the second electronic device, in response to the first input, wherein the control instruction is used for controlling the second electronic device to transmit the target object to the third electronic device; wherein in a case that the target object comprises a video file, the control instruction is used for controlling the second electronic device to transmit second display data to the third electronic device, synthesize a first audio signal and a third audio signal to obtain a first target audio signal and transmit the first target audio signal to the third electronic device; wherein the first audio signal is a voice signal corresponding to the call between the second electronic device and the third electronic device, the third audio signal is an audio signal corresponding to the video file, and the second display data is display data corresponding to video frames of the video file;

the control instruction is further used for controlling the second electronic device to display a first window on an interface of the call between the second electronic device and the third electronic device and play the video file in the first window;

the first input comprises a first sub-input and a second sub-input, the receiving the first input from the user with regard to the target identifier and the display area of the screen projection content comprises:

receiving the first sub-input from the user on an icon of a first application;

transmitting a first query request to the second electronic device, in response to the first sub-input; wherein the first query request is used for requesting to query objects contained in the second electronic device;

displaying all identifiers of all of the objects contained in the second electronic device based on a first query response fed back by the second electronic device in response to the first query request, wherein the target identifier is an identifier in all of the identifiers; and
receiving the second sub-input from the user with regard to the target identifier and the display area of the screen projection content.

2. The method according to claim 1, wherein the first input comprises a drag input performed by a user by dragging the target identifier to the display area of the screen projection content.

3. The method according to claim 1, wherein after the receiving a first input from a user with regard to a target identifier and a display area of the screen projection content, the method further comprises:
transmitting the target object to the second electronic device in response to the first input in a case that the target object is stored in the first electronic device.

4. The method according to claim 1, wherein before the receiving screen projection content transmitted by a second electronic device, the method further comprises:
receiving a screen projection request transmitted by the second electronic device, wherein the screen projection request is used for requesting to project a real-time display interface of the second electronic device onto the first electronic device for display; and
transmitting a screen projection response to the second electronic device in response to the screen projection request, wherein the screen projection response is used for indicating that the first electronic device agrees to establish a screen projection connection, wherein
the screen projection content is used for indicating the real-time display interface of the second electronic device.

5. The method according to claim 1, wherein the target object comprises a video file;
the displaying the screen projection content comprises:
displaying the screen projection content in a first display area in a display screen of the first electronic device; and
after the transmitting a control instruction to the second electronic device, the method further comprises:
displaying a first window in the first display area, the video file being played in the first window;
receiving a second input from a user with regard to the first window; and
in response to the second input, displaying a second window in a second display area and playing the video file in the second window, wherein the second display area is a display area in the display screen other than the first display area.

6. A sharing method, applied to a second electronic device, the method comprising:
transmitting screen projection content to a first electronic device in a case that the first electronic device and the second electronic device are in a screen projection connection and the second electronic device is in a call with a third electronic device;
receiving a control instruction transmitted by the first electronic device, wherein the control instruction is generated by the first electronic device after receiving a first input from a user with regard to a display area of the screen projection content displayed by the first electronic device and a target identifier, the target identifier is used for indicating a target object, and the target object is an object in the second electronic device; and
transmitting the target object to the third electronic device in response to the control instruction; wherein the transmitting the target object to the third electronic device in response to the control instruction comprises:
in a case that the target object comprises a video file, in response to the control instruction, transmitting second display data to the third electronic device, synthesizing a first audio signal and a third audio signal to obtain a first target audio signal and transmitting the first target audio signal to the third electronic device; wherein the first audio signal is a voice signal corresponding to the call between the second electronic device and the third electronic device, the third audio signal is an audio signal corresponding to the video file, and the second display data is display data corresponding to video frames of the video file; and
displaying a first window on an interface of the call between the second electronic device and the third electronic device and playing the video file in the first window;
the first input comprises a first sub-input and a second sub-input, before the receiving the control instruction transmitted by the first electronic device, the method further comprises:
receiving a first query request transmitted by the first electronic device, wherein the first query request is generated by the first electronic device after receiving the first sub-input from the user on an icon of a first application, and the first query request is used for requesting to query objects contained in the second electronic device;
transmitting a first query response to the first electronic device, in response to the first query request, wherein the first query response is used for the first electronic device to display all identifiers of all of the objects contained in the second electronic device, and the target identifier is an identifier in all of the identifiers.

7. The method according to claim 6, wherein before the receiving a control instruction transmitted by the first electronic device, the method further comprises:
receiving the target object transmitted by the first electronic device.

8. An electronic device, being a first electronic device and comprising a processor, a memory, and a program or an instruction stored in the memory and executable on the processor, wherein the program or the instruction, when executed by the processor, causes the first electronic device to perform:
receiving screen projection content transmitted by a second electronic device in a case that the first electronic device and the second electronic device are in a screen projection connection and the second electronic device is in a call with a third electronic device;
displaying the screen projection content;
receiving a first input from a user with regard to a target identifier and a display area of the screen projection content, wherein the target identifier is used for indicating a target object, and the target object is an object in the second electronic device; and
transmitting a control instruction to the second electronic device, in response to the first input, wherein the control instruction is used for controlling the second electronic device to transmit the target object to the third electronic device; wherein
in a case that the target object comprises a video file, the control instruction is used for controlling the second electronic device to transmit second display data to the third electronic device, synthesize a first audio signal and a third audio signal to obtain a first target audio signal and transmit the first target audio signal to the third electronic device; wherein the first audio signal is a voice signal corresponding to the call between the second electronic device and the third electronic device, the third audio signal is an audio signal corresponding to the video file, and the second display data is display data corresponding to video frames of the video file;

the control instruction is further used for controlling the second electronic device to display a first window on an interface of the call between the second electronic device and the third electronic device and play the video file in the first window;

the first input comprises a first sub-input and a second sub-input, the receiving the first input from the user with regard to the target identifier and the display area of the screen projection content comprises:

receiving the first sub-input from the user on an icon of a first application;

transmitting a first query request to the second electronic device, in response to the first sub-input; wherein the first query request is used for requesting to query objects contained in the second electronic device;

displaying all identifiers of all of the objects contained in the second electronic device based on a first query response fed back by the second electronic device in response to the first query request, wherein the target identifier is an identifier in all of the identifiers; and receiving the second sub-input from the user with regard to the target identifier and the display area of the screen projection content.

9. The electronic device according to claim 8, wherein the program or the instruction, when executed by the processor, causes the first electronic device to further perform:

transmitting the target object to the second electronic device in response to the first input in a case that the target object is stored in the first electronic device.

10. The electronic device according to claim 8, wherein the program or the instruction, when executed by the processor, causes the first electronic device to further perform:

receiving a screen projection request transmitted by the second electronic device, wherein the screen projection request is used for requesting to project a real-time display interface of the second electronic device onto the first electronic device for display; and transmitting a screen projection response to the second electronic device in response to the screen projection request, wherein the screen projection response is used for indicating that the first electronic device agrees to establish a screen projection connection, wherein the screen projection content is used for indicating the real-time display interface of the second electronic device.

11. The electronic device according to claim 8, wherein the target object comprises a video file;

the program or the instruction, when executed by the processor, causes the first electronic device to perform:

displaying the screen projection content in a first display area in a display screen of the first electronic device; and the program or the instruction, when executed by the processor, causes the first electronic device to further perform:

displaying a first window in the first display area, the video file being played in the first window;

receiving a second input from a user with regard to the first window; and in response to the second input, displaying a second window in a second display area and playing the video file in the second window, wherein the second display area is a display area in the display screen other than the first display area.

12. An electronic device, being a second electronic device and comprising a processor, a memory, and a program or an instruction stored in the memory and executable on the processor, wherein when the program or the instruction is executed by the processor, steps of the sharing method according to claim 6 are implemented.

13. A non-transitory computer-readable storage medium, storing a program or an instruction, wherein when the program or the instruction is executed by a processor, steps of the sharing method according to claim 1 are implemented.

14. A non-transitory computer-readable storage medium, storing a program or an instruction, wherein when the program or the instruction is executed by a processor, steps of the sharing method according to claim 6 are implemented.

15. The electronic device according to claim 8, wherein the first input comprises a drag input performed by a user by dragging the target identifier to the display area of the screen projection content.

16. The electronic device according to claim 12, wherein the program or the instruction, when executed by the processor, causes the second electronic device to further perform:

receiving the target object transmitted by the first electronic device.

* * * * *